April 18, 1933.  N. SKILLMAN  1,904,770
COMBINED END THRUST AND SELF ALIGNING SUPPORTING BEARING
Filed May 16, 1928
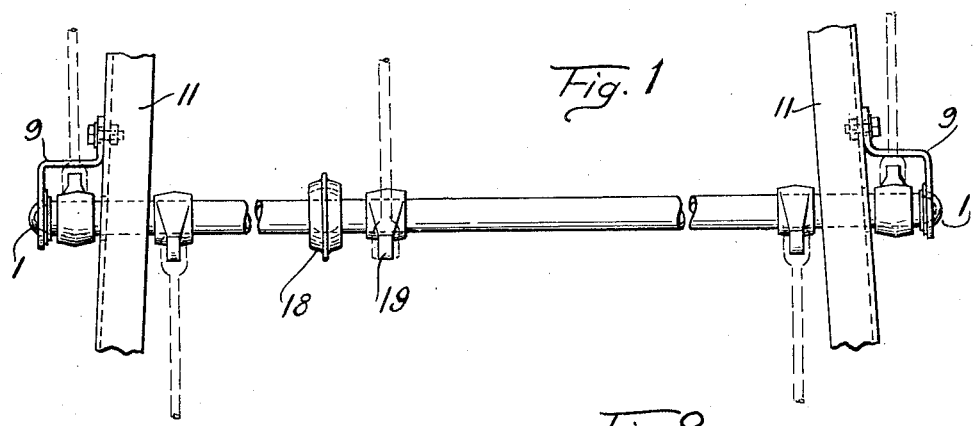
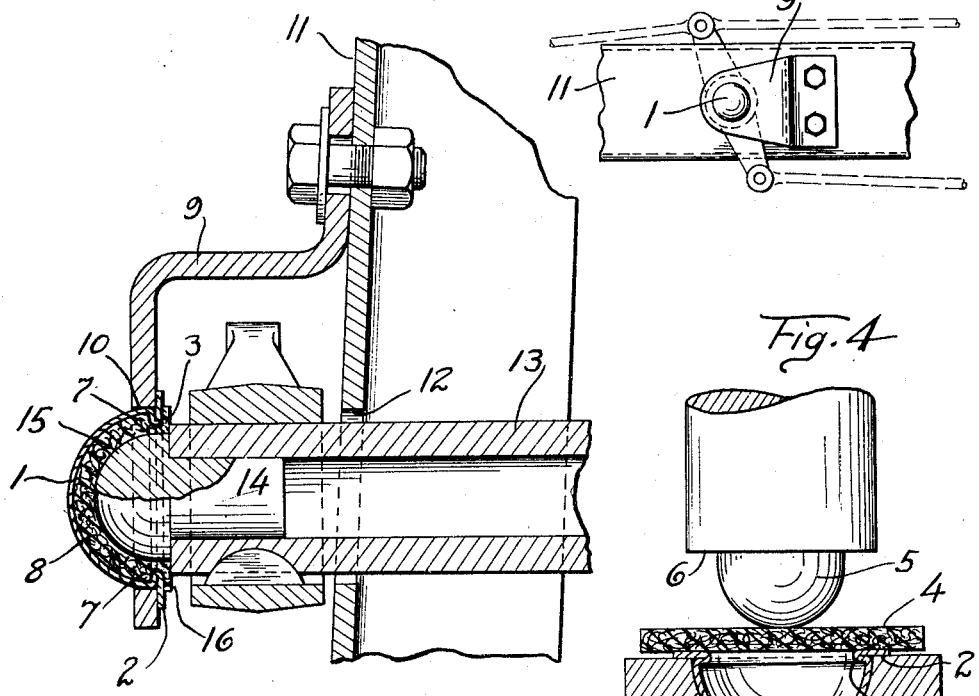
INVENTOR
Newton Skillman
BY
Stuart C. Barnes
ATTORNEY Patented Apr. 18, 1933

1,904,770

UNITED STATES PATENT OFFICE

NEWTON SKILLMAN, OF HIGHLAND PARK, MICHIGAN, ASSIGNOR TO O. & S. BEARING CO., OF DETROIT, MICHIGAN, A CORPORATION OF MICHIGAN

COMBINED END THRUST AND SELF-ALIGNING SUPPORTING BEARING

Application filed May 16, 1928. Serial No. 278,179.

This invention relates to a combined end thrust and self-aligning supporting bearing. It has to do particularly with the provision of an extremely simple and inexpensive bearing which may be utilized either as original equipment or as accessory equipment for supporting various kinds of shafts, including cross brake shafts for chassis frames.

Self-aligning, self-lubricating bearings for supporting cross brake shafts in automobile frames, to compensate for inaccuracies in initial fabrication and assembly, have recently been used to considerable extent in the automobile industry. These bearings have provided for universal alignment and have also embodied the use of lubricant impregnated fibrous bushings for directly carrying the shaft. Such bearings have proven very satisfactory and have gone into universal use.

It is the object of the present invention to provide an improved form of self-lubricating, self-aligning bearing, which may be quickly and easily applied to shafts, such as the cross brake shafts of an automobile chassis frame after assembly, or may be very quickly and easily applied as a part of the original equipment. This bearing is formed in a very novel manner by a very simple operation, and preferably is semi-spherical in shape, so as to cooperate with a similarly shaped portion on the end of a shaft, whereby to not only support the shaft and automatically align the same, but to take up all end thrust in the shaft.

In the drawing:

Fig. 1 is a fragmentary plan view of a cross brake shaft for a chassis frame, embodying the present invention.

Fig. 2 is a fragmentary end view of the structure shown in Fig. 1.

Fig. 3 is an enlarged longitudinal view of one end of the structure shown in Fig. 1, and showing in detail the preferred manner of utilizing my novel bearing as a combined bearing member and end thrust member.

Fig. 4 is a detail view illustrating the method of fabricating the novel bearing member.

The bearing forming the gist of the present invention preferably comprises an outer bearing or casing 1, formed by stamping out from a single piece of metal, into a half-spherical shape. In stamping out this bearing member 1 it is preferably so stamped as to provide an annular flange 2 and an inwardly projecting flange or ridge 3.

A disc of lubricant impregnated fibrous material 4 is then placed over the stamped out member 1, and by means of a suitable spherical shaped plunger 5 is forced within the member 1 and compressed into shape, the portion 5 of the plunger compressing the fibrous material 4 into a spherical preformed shape and the portion 6 of the plunger contacting with the outer annular edge of the disc 4 to press the same into shape upon the flange 2, as best shown in Fig. 3.

In forming this novel bearing member, and in pressing the disc 4 into shape, such disc tends to snap into place at the point 7 underneath the inwardly extending ridge 3, whereby such ridge securely holds the preformed spherical shaped bushing in place. The bushing, preformed and ready for use, is shown as at 8 in Fig. 3.

A suitable bracket 9 is provided with an aperture 10 for receiving the bearing member 1, and such bracket 9 may be adjustably or otherwise secured to an automobile chassis frame 11 or any other suitable support. In case of an automobile chassis frame, the member 11 is preferably apertured as at 12 to freely receive a hollow shaft member 13 adapted to project through the aperture.

A plug 14 having a spherical head member 15 is positioned within each end of the shaft 13, the head being preferably of slightly less diameter than the end of the shaft. It will be obvious that by positioning the bearing member 1 at the end of the shaft 13 and in contact with the spherical head member 15, and securely mounting the bracket 9 on the frame 11, that the bracket member will act both as an end thrust and as a support for the shaft 13, providing, of course, that the other end of the shaft is adequately supported, preferably by means of a similar bearing member and bracket, as shown in Fig. 1. The end of the shaft 13, which is of greater diameter than the spherical member 15, is adapted to contact with the flange portion 16 of the fibrous bushing, whereby to positively prevent metal-to-metal contact between the bearing and shaft.

It will be obvious that by use of such a simple, half-spherical bearing member, that it might be so arranged in connection with a shaft as to provide a 100% end thrust and 50% side or supporting thrust, or 100% end thrust and 100% supporting thrust or various combinations of the two.

In Fig. 1 I have shown my novel bearing member as applied to an automobile chassis frame for supporting the cross brake shaft thereof. Suitable actuating members are connected to the cross brake shaft in the usual manner, as shown, and a self-aligning, self-lubricating bearing member 18 may be positioned adjacent the actuating lever 19 for reinforcing the shaft. However, this may be done away with in some instances and is not at all necessary in connection with the present invention.

Hollow cross brake shafts, such as 13, have been heretofore utilized in connection with automobile chassis frames and have usually been filled with a lubricant which thus lubricates the shaft bearings for a considerable length of time. It will thus be seen that the present bearing can be applied as an accessory for such cross brake shafts by merely removing the plugs in the end of the shaft and replacing the same with the spherical headed members 15.

The present invention permits of very quick and easy assembly of cross brake shafts or the like, and upon tightening the brackets 9 the resiliency of the preformed fibrous bushing 8 will permit the same to be compressed to take up end thrust and will maintain such resiliency for a considerable length of time.

What I claim is:

1. In combination with a hollow oscillatable shaft, of plugs having substantially hemi-spherical heads within the ends of said shaft, hemi-spherical bearing members formed of stamped sheet metal linings in said bearings of preformed, compressed, lubricant impregnated fibrous material for directly engaging the spherical heads of said plugs whereby to provide end thrust as well as bearing supports for each end of said shaft.

2. The combination with an automobile chassis frame and a cross brake shaft extending through apertures in opposite frames, of hemi-spherical members positioned at each end of said shaft, bearing members having a preformed hemi-spherical shaped lining of lubricant impregnated fibrous material, and brackets secured to said frame members for positioning the said bearing members in direct contact with the hemi-spherical members on the ends of the shaft.

3. A combined end thrust and supporting bearing, comprising a half-spherical shell of stamped sheet metal, a compressed preformed spherical shaped bushing within said shell formed of lubricant impregnated fibrous material, and a flange around the open end of said shell, said compressed bushing extending around said flange whereby to lock the bushing in the shell and to also form an abutment for the member to be supported.

4. The combination with an oscillatable cross shaft having hemi-spherical end portions, of combined end thrust and self-aligning bearing supports for each end of the shaft, said supports comprising an outer shell of stamped sheet metal, and a preformed, compressed, lining of lubricant impregnated fibrous material, said lining being hemi-spherical in shape and contour whereby to directly engage the hemi-spherical end portions of the shaft whereby to first align the shaft and then support and absorb the end thrust thereof.

5. A self-aligning cross shaft comprising, bearing members for each end of the shaft the actual bearing surface of which is formed with a spherical contour, outer bearing members for each end of the shaft having inner bearing surfaces thereof half-spherical in shape, a lining of compressible self-lubricating material in said outer bearing members, and means for holding said end bearing members and compressible material against the bearing members at each end of the shaft, said material being compressible by the moving of said outer bearing members axially of the shaft, said outer bearing members and said compressible material serving to support the shaft and absorb the end thrust thereof.

In testimony whereof I affix my signature.

NEWTON SKILLMAN.